Aug. 1, 1933.  H. W. LANGBEIN  1,920,263
APPARATUS FOR MEASURING BRAKING COMPONENTS
Filed Aug. 24, 1927

INVENTOR:
HAROLD W. LANGBEIN,
BY
ATTORNEY.

Patented Aug. 1, 1933

1,920,263

UNITED STATES PATENT OFFICE 1,920,263

APPARATUS FOR MEASURING BRAKING COMPONENTS

Harold W. Langbein, Los Angeles, Calif., assignor, by direct and mesne assignments, of one-half to Fabian E. Macabee and Edward L. Macabee, Hayward, Calif., and one-half to Harry C. Schroeder, Oakland, Calif.

Application August 24, 1927. Serial No. 215,106

4 Claims. (Cl. 265—25)

This invention relates to the testing of automobile brakes for determining whether the braking forces on the wheels are equal.

It is ordinary practice to determine the adjustment of the brakes by skidding the wheels, or by using certain brake testing apparatus which have recently come into use.

It is an object of this invention to provide an apparatus for measuring braking component whereby the equality of the braking forces on the wheels may be determined by observing the braking reaction.

Other objects and the salient advantages of this invention will be made manifest in the following description.

Referring to the drawing in which the invention is illustrated:

Figure 1:
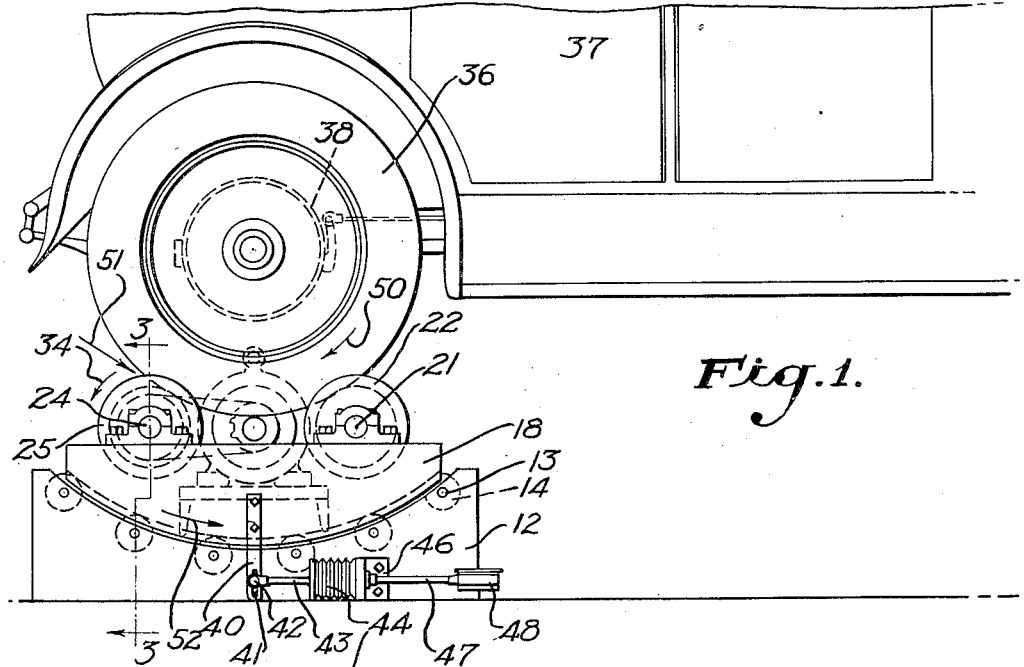
Fig. 1 is an elevational view.

The invention provides testing units 11, each of which are adapted to support a wheel having a brake which is to be tested. If the testing device is to be used for cars having four-wheel brakes, four units may be provided. In the drawing the apparatus is adapted for use on vehicles having brakes only on the two rear wheels; therefore, only two units are provided.

The units are identical in construction and therefore the apparatus will be described with reference to one of them. Each unit 11 has a base in the form of a frame 12 which carries shafts 13 on which an arcuated bearing in the form of supporting rollers 14 are rotatable. As illustrated best in Fig. 1, the shafts 13 are disposed on a line generated around a point; therefore, the rollers 14 are in arcuated arrangement. Adapted to be carried by the rollers 14 is a supporting means in the form of a cradle 17. The cradle 17 has side plates 18, the lower parts of which are provided with races 19 which engage the rollers 14. The side plates 18 may be secured together by suitable cross-arms 19ª.

Figure 2:
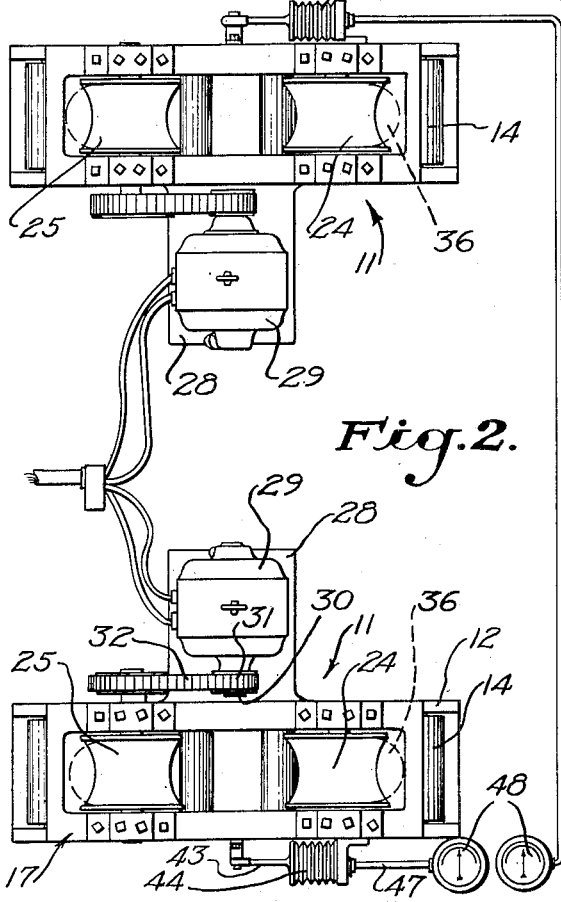
Fig. 2 is a plan view.
Figure 3:
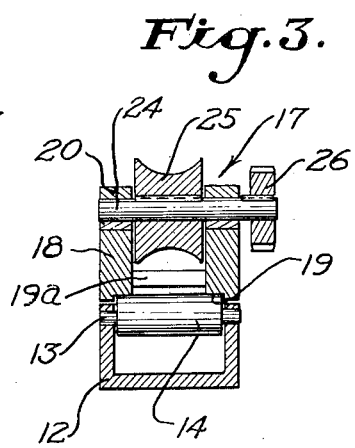
Fig. 3 is a section taken on the line 3—3 of Fig. 1.

Supported by the side plates 18 of the cradle 17 are pillow blocks 20 arranged in pairs, as shown. One pair of pillow blocks 20 supports a shaft 21 on which an idler wheel 22 is secured. The other pair of pillow blocks 20 supports a drive shaft 24 on which a supporting means in the form of a drive wheel 25 is rigidly secured. One end of the drive shaft 24 projects through one of the pillow blocks 20 and has a sprocket 26 attached thereto. As illustrated in Figs. 1 and 2, each unit 11 is provided with a table 28 which supports operating means in the form of a drive motor 29. The drive motor 29 has a shaft 30 which supports a drive sprocket 31. Drivably connecting the sprockets 26 and 31 is a sprocket chain 32. When the motor 29 is energized the drive wheel 25 is rotated in the direction indicated by the arrow 34 of Fig. 1. The drive wheel 25 and the idler wheels 22 are aligned with each other so as to support a wheel 36 of an automobile 37 (Fig. 1) having a brake 38 operating on it.

Extending downward from one of the side plates 18 of the cradle 17 is an arm 40, the lower end of which is provided with a slot 41. Extending through the slot 41 is a pin 42 which is supported by an arm 43. The arm 43 is connected to one end of a sylphon 44, the other end of which sylphon 44 is attached to one of the side plates 18 by a bracket 46. Connected to the interior of the sylphon 44, which interior is filled with a liquid, is a pipe 47 which extends to a pressure gauge 48. The pipe 47 of one of the units 11 is considerably longer than the pipe 47 of the other unit so that the two gauges 48 may be placed adjacent to each other so that the reactions may be compared. The construction just described constitutes the measuring means, or the pressure recording means, of the invention.

The operation of the invention is as follows:

The vehicle 37 is driven onto the testing device so that the rear wheels 36 on which the brakes 38 are located rest in the pairs of drive and idler wheels 25 and 22. The automobile is then placed out of gear. A chain or rope is attached to the vehicle to keep it substantially in a stationary position. The two motors 29 are energized so that the drive wheels 25 drive the automobile wheels 36 in a direction indicated by the arrow 50 of Fig. 1. At this time the automobile wheels 36 turn freely and but little power is required to drive them. When the apparatus has attained its maximum constant speed, which is sufficient to turn the automobile wheels 36 as fast as they will turn when the vehicle is travelling ten or fifteen miles per hour, the brakes 38 are applied. This places a resistance on the drive wheels 25 and tends to retard them, and urge the cradle about its arcuate path. At this time more power is required to rotate the drive wheels 25 and a braking force is exerted on each device 11 in the direction indicated by the arrow 51 of Fig. 1. This braking force tends to rotatably move the cradle 17 in the direction indicated by the arrow 52 of Fig. 1. It will be seen, therefore, that the reactional force created when the brakes are applied causes, or tends to cause, the drive roller and the cradle to bodily move. The cradle exerts a pressure on the sylphon 44, through the arms 40 and 43. The liquid in the sylphon 44 is compressed in proportion to the magnitude of the braking force indicated by the arrow 51, the pressure of the liquid being indicated on the gauge 48. The arcuate movement of the roller type drive permits continuous contact of the rollers with the vehicle wheel without oscillation of the vehicle in a vertical direction.

If both of the brakes 38 have equal braking pressures, the two gauges 48 will indicate the same pressure; however, if one of the brakes exerts a greater braking pressure than the other, the gauge of the unit associated with the wheel of this brake will register a higher pressure. In this manner it will be possible to determine which brake is applying a greater braking pressure, and it will be an easy matter to accurately adjust them.

The invention in its broad conception is embodied in an apparatus for testing a brake which involves the use of the braking reaction or breaking component for determining the magnitude of the braking pressure or braking force applied by the brakes through the application of the braking reaction to displace a pivotally mounted wheel support which is gravitationally returned to normal position.

In this application I present only one form of apparatus but it will be understood that various modifications may be made by those skilled in the art within the scope of the appended claims in which I define my invention.

I claim as my invention:

1. An apparatus for testing brakes comprising: a base; an arcuated bearing in the form of a plurality of rollers in arcuated alignment carried by said base; a cradle supported by said arcuated bearing and capable of arcuate movement on said arcuated bearing; a drive wheel carried by said cradle, being arranged for rotating a wheel carrying an element of the brake to be tested; operating means for rotating said drive wheel; and reaction measuring means for measuring the force tending to arcuately move said cradle.

2. In combination, a frame, reaction means comprising rotatable wheel supporting and driving means mounted in the frame to pivot about a fixed point and gravitationally retained in a normal position, and adapted to support a vehicle wheel having a brake associated therewith, measuring means cooperating with said reaction means for measuring the brake effectiveness, whereby displacement of said reaction means caused by application of the brake while the wheel is being driven is transmitted to said measuring means.

3. A brake testing device comprising a base, a plurality of parallel bearing rollers rotatably mounted in arcuate alignment in said base, an arcuate cradle mounted on said bearing rollers to pivot about a fixed point located above said cradle, a pair of spaced apart, parallel, peripherally grooved supporting rollers adapted to support a wheel carrying an element of the brake to be tested, means for driving said supporting rollers, and measuring means cooperating between said cradle and said base for measuring the effectiveness of the brake and actuated by displacement of the cradle created by the reaction of the brake associated with the wheel.

4. In combination, a frame, reaction means comprising supporting and driving means for supporting and driving a wheel having a brake associated therewith and mounted in said frame to pivot about a fixed point and gravitationally retained in a normal position, and measuring means associated with said reaction means and actuated by the displacement from normal of said reaction means for measuring the effectiveness of the brake to be tested.

HAROLD W. LANGBEIN.